United States Patent
Steinich (10) Patent No.: US 7,392,597 B2
(45) Date of Patent: Jul. 1, 2008

(54) POSITION SENSOR

(75) Inventor: Klaus Manfred Steinich, Zorneding/Pöring (DE)

(73) Assignee: ASM Automation Sensorik Messtechnik GmbH, Moosinning (DE)

(*) Notice: Subject to any disclaimer, the term of this patent is extended or adjusted under 35 U.S.C. 154(b) by 161 days.

(21) Appl. No.: 11/501,399

(22) Filed: Aug. 9, 2006

(65) Prior Publication Data

US 2007/0033823 A1 Feb. 15, 2007

(30) Foreign Application Priority Data

Aug. 10, 2005 (DE) ............... 10 2005 037 862

(51) Int. Cl.
*B65H 61/00* (2006.01)
(52) U.S. Cl. .................................. 33/733; 33/1 PT
(58) Field of Classification Search ............ 33/1 PT, 33/733, 735, 736, 737, 754, 756; 242/251, 242/371, 912
See application file for complete search history.

(56) References Cited

U.S. PATENT DOCUMENTS

| 3,500,546 | A |   | 3/1970 | Pilcher |
|---|---|---|---|---|
| 4,286,386 | A | * | 9/1981 | Long ............... 33/755 |
| 4,653,190 | A |   | 3/1987 | Spain, Jr. |
| 4,910,878 | A |   | 3/1990 | Fleckenstein et al. |
| 5,236,144 | A | * | 8/1993 | Kautz ............... 242/371 |
| 6,499,225 | B1 | * | 12/2002 | Steinich ............. 33/756 |
| 7,197,974 | B2 | * | 4/2007 | Glasson ............. 33/763 |
| 2003/0093907 | A1 | * | 5/2003 | Schroter et al. ....... 33/1 PT |

FOREIGN PATENT DOCUMENTS

| DE | 19726084 |    | 6/1997 |
|---|---|---|---|
| DE | 19726084 | C2 | 2/1999 |
| EP | 0745829 |    | 4/1996 |
| EP | 0982562 |    | 1/2000 |
| GB | 1 343 806 |    | 4/1971 |

* cited by examiner

*Primary Examiner*—G. Bradley Bennett
(74) *Attorney, Agent, or Firm*—Head, Johnson & Kachigian (57) ABSTRACT

A measuring-cable position sensor is provided in a pressure tight, in particular explosion protected manner, wherein all functional elements besides the cable drum and the measuring cable are located in a pressure tight housing, which is stable enough, so that also in case of an explosion in the interior of the pressure-tight housing section no ignition spark can get through the gaps of the housing to the outside.

29 Claims, 5 Drawing Sheets

POSITION SENSOR

CROSS-REFERENCE RELATED APPLICATION

This application claims priority to German Application No. 102005037862.5 filed Aug. 10, 2005.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The invention regards position sensors operating according to the distance measuring cable principle.

Hereby, a measuring cable, mostly wound onto a cable drum only in one layer, pre loaded in wind up direction, is pulled off and the revolutions or partial revolutions during the pulling off are precisely measured with a rotation signal sensor, typically an angle sensor.

Subsequently, an angle sensor is always briefly mentioned instead of a rotation signal sensor without limiting the invention thereupon.

In order to make such a kind of position sensor resistant against external pressure and thereby enabling also a deployment e.g. under water, the main problem is that the cable intake into the housing inevitably is not tight.

In order to operate such a position sensor also in an explosion-sensitive environment, the measuring cable, the cable drum, and the cable intake can be made from a non-spark generating material, in particular stainless steel. However, the risk of spark generation still exists at the electrical components, that is, at the angle sensor and the processing electronics.

Mechanical spark avoidance could be performed at the flat spiral spring but this is very complicated.

Spark avoidance at the electrical units, such as, by limiting the choice of the electrical components to such with current and voltage requirements so low that spark generation is not possible any more, would lead to a poor signal quality.

Housing the potentially spark generating electrical end electronic components in a cavity and filling the remaining cavity with hardening filler material, a non-hardening gel, or bulk material would deny housing the flat spiral spring in this cavity.

BRIEF SUMMARY OF THE INVENTION

It is the objective according to the present invention to provide a position sensor according to the distance measuring cable principle, pressure tight, in particular explosion proof, without having to abandon the design principles for such sensors which have been proven for decades.

This objective is accomplished through providing all parts of the position sensor, besides the cable drum and the measuring cable, with encapsulation against external and/or internal pressure, in the latter case in particular explosion proof.

The principle of interior pressure-tight encapsulation for explosion proofing according to the European Standard 50018 provides for allowing an explosion of the ignitable mixture initially present in the interior of the pressure-tight encapsulation, whereby, however the housing is provided in a way that, in this case, no ignition capable spark can penetrate the housing towards the outside, whereby the gaps in the housing are safe against ignition passage, and the housing is provided stable enough so that even through the pressure of the explosion in the interior it does not change in a way that makes the existing gaps lose their safety against ignition passage.

This is accomplished herein through the walls being stable enough and the gaps being narrow and long enough relative to the deformability of the walls.

The measuring cable and the space where the measuring cable is wound onto the cable drum can only be made dust tight but hardly pressure tight, due to the pass-through of the measuring cable to the outside.

Safety against ignition passage from the inside to the outside can be achieved under certain conditions by providing an annular gap around the measuring cable opposite to a cable outlet long enough relative to its width to provide safety against ignition passage. This is why the cable inlet is provided preferably as a radially protruding cable inlet turret with extended length, and wherein additionally under certain conditions one or several brushes for cleaning the measuring cable can be located. These brushes, however, have to be provided in a manner that prohibits static electricity buildup relative to the cable sliding by to avoid generating sparks.

However, through locating all other moveable and non-moveable but spark generating components, that is, a flat spiral spring, an angle sensor and maybe the processing electronics, in a pressure-tight housing, which is in particular pressure tight enough so that it is explosion proof, only on the parts located outside the housing, like the measuring cable and the cable drum, spark avoidance by design has to be accomplished e.g. through the use of stainless steel and additional plastic coating and generally through the avoidance friction of metal on metal.

The explosion-proof pressure-tightness hereby is accomplished, in particular, through running a shaft that leads from the pressure-tight housing section into the non-pressure tight housing section through this housing in an explosion proof manner, as well as possibly the cable that leads out of the pressure-tight housing.

Also, a non-contact data transfer, instead of a cable pass through, is possible here. Hereby, the signal can be transmitted through the closed housing wall e.g. via electromagnetic waves, whereby no pressure, or other tightness problems, can occur at this location. The energy transfer into the sensor from the outside can also be performed through the closed housing wall, e.g. also via electromagnetic waves, thereby also the operation of the processing electronics inside the sensor can be performed without a current carrying cable through the housing wall.

Preferably the whole pressure-tight housing section, in particular the whole housing, will be made from stainless steel for the said reasons.

Proof against explosion is furthermore accomplished through over-sizing the pressure-tight housing in a manner that, in case of an explosion inside the housing, the housing does not get deformed enough so that the gaps leading out of the housing would not be proof against ignition passage anymore. In particular, the housing has to be able to stand a pressure of far more than 100 bar.

When subsequently pressure tightness is mentioned, it has to be differentiated depending on the application, this means regarding pressure tightness against external or internal pressure. Also regarding the direction of the pressure, a differentiation has to made and respective seal elements etc. for the respective pressure direction have to be provided, in case of pressure tightness in both directions, this means from the inside out and also the outside in, if necessary also two seal elements have to be provided at the same sealing location, whereby each seals in one direction.

A particularly simple and still pressure-tight design can be accomplished through putting a head cover over a tubular, or pot shaped, housing body, wherein at least the interior diameter is rotationally symmetrical, preferably also the exterior diameter, which overlaps the tubular housing part through reaching into it or through exterior overlap so that the axial length of an annular gap forming in between relative to the width of the gap is large enough to be safe against ignition passage.

In case a pot-shaped part is used as a housing body, only one such annular gap is created. When using a tubular housing body with a head cover sealing on both sides, two annular gaps exist, whereby any opportunity to reduce such gaps or make them smaller statically helps to reduce risk.

The pressure tightness is accomplished in a simple manner by providing an annular gap between a head cover and the housing wall as a threaded connection and by providing a seal, preferably an O-ring, at one end of the actual axial extension of the thread. Hereby, only an axial extension of the thread, not also the one of the O-ring area, is considered gap length.

Through this design, a head cover can be tightened with a high torque relative to the housing wall, which provides for a high-pressure resistance in combination with a sufficient wall thickness of the housing parts. In one of the head covers, preferably in the center, an opening is provided to insert a cable grommet. The cable grommet, which by itself has to be proof against ignition passage, must also be mounted in a manner that is safe against ignition passage as described, this means with a respective ratio of gap length versus gap width relative to the surrounding housing.

Also, the cable grommet is preferably screwed with an outside thread into an inside thread of a pass-through opening wherein a seal is located at the end of the thread.

Also, in the other head cover, preferably, a central pass-through is located through which a shaft connecting a spiral spring and an angle sensor to the cable drum in a rotation proof manner passes through the housing. Also, a layout, which is proof against ignition passage, has to be achieved through the ratio of length versus width of the annular gap formed around the shaft, wherein the shaft is held in the same head cover, preferably, by a roller bearing after the annular gap, whereby the actual length of the bearing cannot be counted towards the length of the annular gap.

The length of the required annular gaps can be achieved in a simple manner by making the head cover from material thick enough so that, at least in the area of the holes through this head cover and of the annular gaps, the required length of the annular gap is achieved without additional measures.

The non-pressure proof housing section is pot shaped and placed onto the outside of the pressure proof housing section, preferably, at its front face, directly or indirectly.

Indirect mounting is preferred, wherein standoff plates are initially placed onto external front faces of head covers, radially protruding beyond the head covers whose external diameter is approximately equivalent to the diameter of the housing body, serving to place the pressure-proof housing section with its longitudinal axis parallel to a base plate.

These standoff plates are bolted through pass-through holes into blind holes in the head covers or in the bottom of the pressure-proof housing section.

For this purpose, the pass-through holes in one of the standoff plates are provided as arched, long holes centrally located around the middle to be able to align the rotation position of the second standoff plate flush with the first standoff plate, in spite of the rotation position of the head cover relative to the body of the pressure-proof housing not being determined before the mounting.

A particularly simple assembly method is provided through providing the connecting shaft at the inside end, this means at the end inside the pressure-proof housing section as a hollow shaft, and inserting a shaft end of the angle sensor in a rotation proof manner.

Similar, for mounting the printed circuit board which carries the processing electronics with a head space from the angle sensor and from the head cover opposite to the shaft, in particular in a plane perpendicular to the longitudinal axis of the rotationally symmetrical pressure proof housing section, where it is bolted to the spring housing e.g. through a spacer in order to be electrically connected with the angle sensor after mounting the spring, the spring housing and the angle sensor.

In order to avoid spark generation on the moving components in the non-pressure proof only dust proof housing section, this housing section and also the measuring cable is made from stainless steel and is coated in particular with plastic, e.g. nylon. Also, the outlet opening for the measuring cable from the non-pressure proof housing section is not made from metal but preferably from plastic.

Through this design of the particular components, a simple and fast assembly process can be realized, which is performed upon the pressure-proof housing section and upon the components contained therein so, that a shaft is pushed in from the inside to the outside, first through a roller bearing and, thereafter, through a head cover or the bottom of a pot-shaped housing body until a shoulder of the shaft contacts, the spring housing, with an inserted flat spiral spring, is pushed onto the shaft from its rear free end, connecting the flat spiral spring rotation proof with the shaft, a rotation proof connection is established, in particular a bolted connection of the spring housing with the head cover or the bottom, rotation proof placement of an angle sensor onto the rear end of the shaft and supported through a torque link relative to the spring housing, electrical connection of the angle sensor, in case processing electronics for the signals of the angle sensor, is also included in the housing, and the signals are not transmitted to processing electronics outside the sensor housing the assembly process continues as follows:

in case, instead of a cable pulled through a cable grommet through the housing, e.g. through the head cover, a connector or a connector socket on the outside of the housing, e.g. of the head cover is used, it is inserted into the head cover instead of the cable grommet and is electrically connected with the angle sensor.

Thereby, to facilitate all assembly steps described so far, as a first step, the first head cover is initially bolted together with a first standoff plate that is mounted to a base plate to be able to assemble all components carried by the first head cover more easily.

mounting processing electronics to a spring housing through a spacer, pulling a cable connected to the processing electronics through the head cover and the cable grommet, screwing and tightening the head cover into a frontal opening of a housing body, inserting the cable grommet into the head cover.

The further assembly of the sensor beyond the pressure tight housing section is then performed so that on its face at least a second standoff plate is bolted on and thereby the standoff plates are brought into a position relative to each other that is flush in an axial direction and they are bolted onto a base plate if necessary.

Now, or after inserting the shaft through the first head cover and bolting down the first stand off plate, the non-pressure tight housing, with the attached wound cable drum, can be placed onto the one standoff plate and a flat spiral spring can be wound up through relative rotation of the housing parts and eventually the non-pressure tight housing part be can be bolted to the pressure-tight housing part in this preloaded rotation position.

BRIEF DESCRIPTION OF THE DRAWINGS

Embodiments according to the invention are subsequently described in more detail in an exemplary manner.

DETAILED DESCRIPTION OF THE INVENTION

Figure 1:
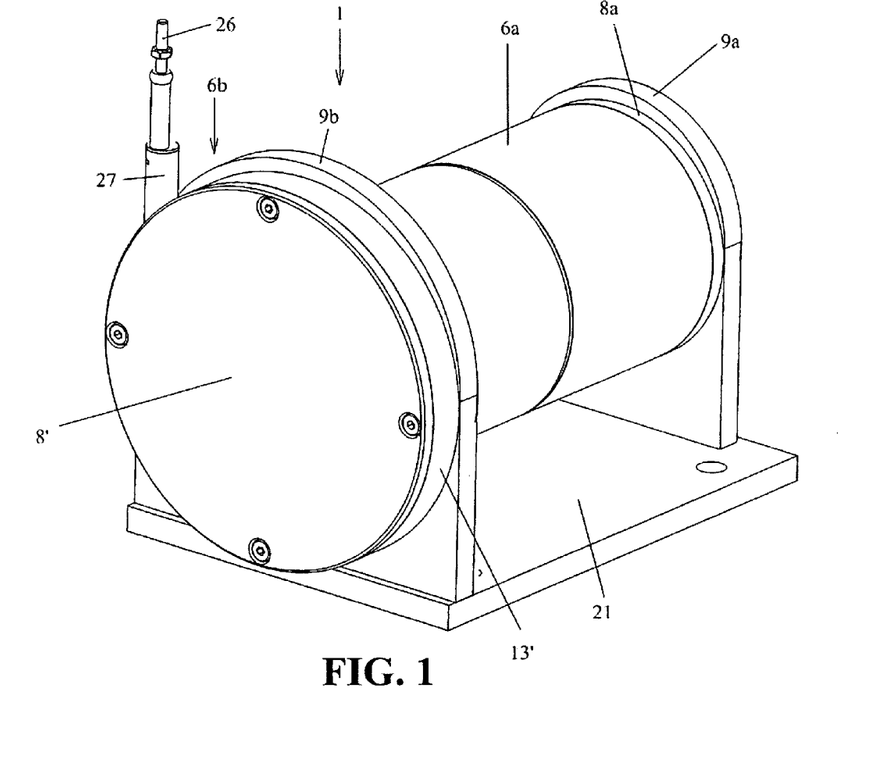
FIG. 1 is a perspective view of the completely assembled position sensor of the present invention.

FIG. 1 shows the sensor 1 comprising a cylindrical housing section 6a, held in parallel to a base plate 21 at a distance through frontal standoff plates 9a,b, whereby a second housing part 6b is mounted on an outside of one of these standoff plates, from where a measuring cable 3 runs out, whose mounting adapter 26 rests on a cable intake turret 27 when the cable is wound up.

Figure 2A:
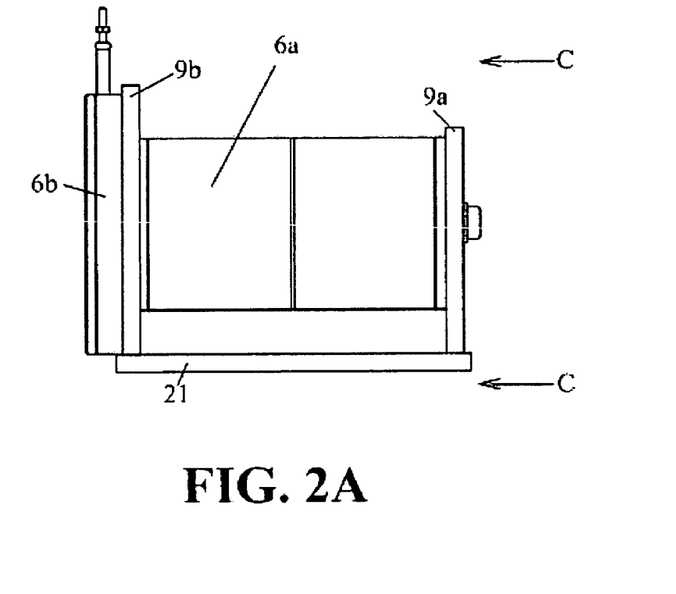
FIGS. 2a-c are outside views of the position sensor.
Figure 2B:
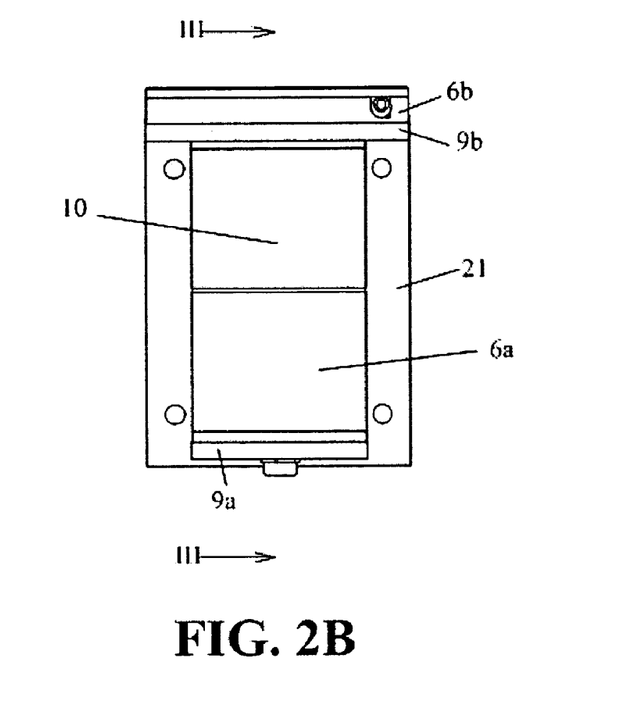
Figure 2C:
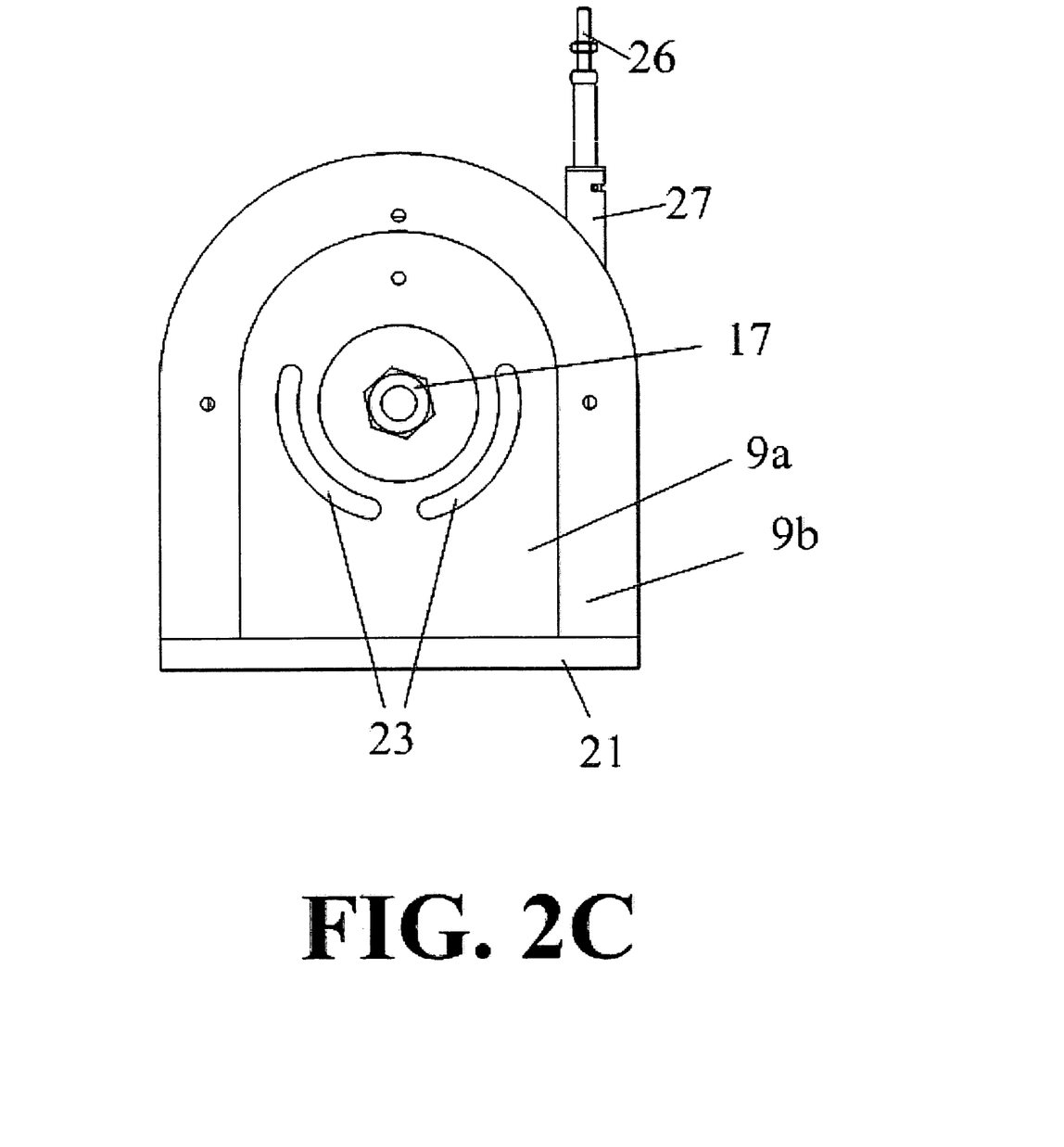

Within the FIG. 2, FIG. 2a shows a side view perpendicular to a longitudinal axis 10, FIG. 2b shows the top view and FIG. 2c shows the front view from the side opposite to housing part 6b.

Figure 3:
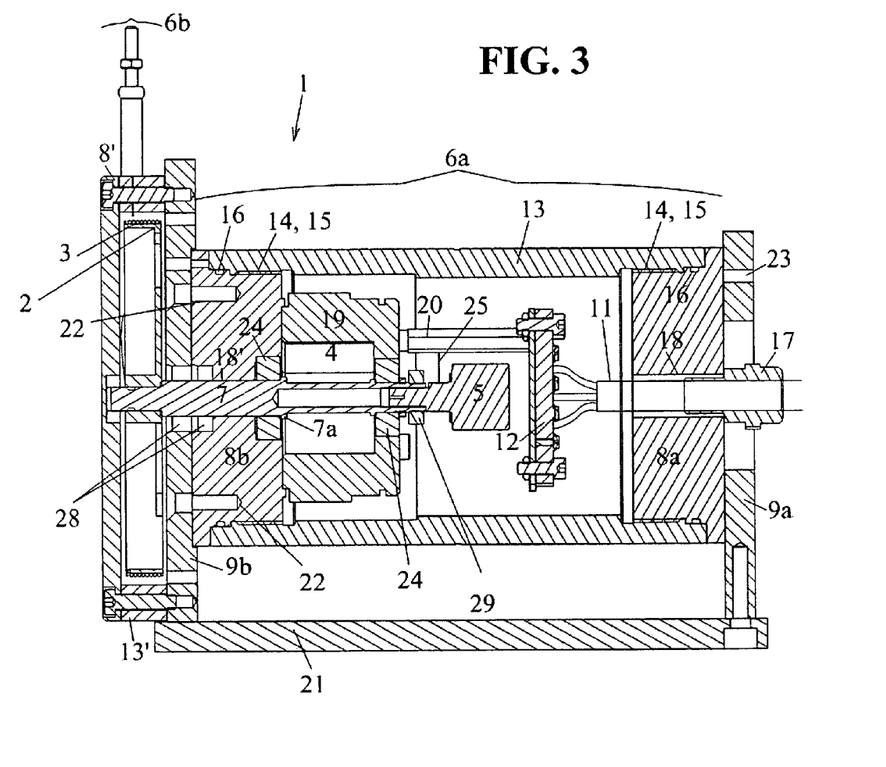
FIG. 3 is a longitudinal cut view of the sensor.

The following details can be seen best with reference to the longitudinal cut view in FIG. 3. The section proof against outside and inside pressure and explosion proof, in particular, is housing section 6a, which is rotationally symmetrical and provided from a cylindrical, tubular housing body 13 with several shoulders and steps in its interior diameter, which is closed on its front faces through head covers 8a, b, which rest on the front face of housing body 13 with one shoulder and which reach into an interior diameter of housing body 13 with the majority of their length, where they are screwed into an inside thread.

Between an abutting flange and a threaded connection 15 of head covers 8a,b, a respective circumferential O-ring 16 is located in a respective groove. Head covers 8a,b are screwed into housing body 13 strong enough so that a desired tightness is achieved.

Onto exterior surfaces of head covers 8a,b, standoff plates 9a,b are placed and bolted from outside into blind holes 22 of the head covers, whereby standoff plates 9a,b radially protrude beyond housing body 13 in one direction by the same distance and can, therefore, be used for bolting onto base plate 21.

Furthermore, one standoff plate 9b is also large enough in a radial direction so it protrudes over the remaining circumference section of housing body 13 and, thereby, beyond face plate 8b so that housing 6b can be put onto standoff plate 9b from the side facing away from housing section 6a, again including a tubular housing body 13' and a head cover 8', whereby no pressure tight, but only a dust proof housing section 6b is formed.

In housing section 6b, a cable drum 2 is held in a bearing and is wound with measuring cable 3, preferably in one layer, which exits from housing section 6b through cable exit turret 27, on whose external face mounting adapter 26 on a free end of the cable rests when the cable is completely wound up.

Since cable drum 2 has to be connected rotation proof with several other functional elements which are all prone to generate sparks and, therefore, are located in the pressure tight and, in particular, explosion protected housing section 6a, the assembly is performed as follows:

Initially head cover 8b, later facing housing section 6b, can be bolted together with standoff plate 9b, which is already bolted together with base plate 21, whereby lip seals 28 are inserted there beforehand.

From an interior of housing section 6a, preferably after the described bolting assembly, a connecting shaft 7 is inserted through an appropriate central pass-through bore 18' in head cover 8b and roller bearings 24 located on the inside of head cover 8b and lip seals 28 on the outside of head cover 8b and on the inside of standoff plate 9b so that the free end protrudes from standoff plate 9b into an axial area, where cable drum 2 is located later.

Thereafter, in the interior of housing section 6a, a flat spiral drum 4 and a receiving, detachable pot-shaped spring housing 19 are preferably pushed together onto a part of shaft 7 protruding from head cover 8b towards the inside, whereby flat spiral spring 4 is connected with its one, preferably outside, end to a spring housing 19 in a rotation proof manner and with its other, preferably interior, end to shaft 7 in a rotation proof manner, e.g. through axial insertion.

Thereafter, spring housing 19 is mounted to head cover 8b rotation proof, in particular, through bolting.

Thereby, also in the bottom of spring housing 19, a roller bearing 24 is located at the inner end of shaft 7 protruding from spring housing 19, which is a hollow shaft and open at its face end, so that the shaft end of an angle sensor 5 can be inserted therein and fixated against rotation through a clamping nut 29.

In an open axial space between angle sensor 5 and an end of housing body 13, which is still free, one or several printed circuit boards with processing electronics 12 are mounted, e.g. with a spacer 20 relative to spring housing 19.

In addition, shaft 7 is supported against rotation with a torque link 25 with reference to spacer 20.

Processing electronics 12 are connected to electrical terminals of angle sensor 5, on the one hand, and to the ends of a cable 11, on the other hand, which conducts output signals of processing electronics 12 to the outside.

Therefore, cable 11 is run to the outside through an explosion-proof cable grommet 17, which is screwed into central pass-through hole 18 of the other head cover 8a in a pressure tight and explosion proof manner.

Head cover 8a, like the other head cover 8b, is provided with a flange and an external thread and O-ring 16 and screwed into a respective internal thread of housing body 13, which was previously screwed onto first head cover 8b.

Pulling cable grommet 17 close, which has cable 11 already running through it, and screwing it in is preferably performed after screwing head cover 8a into housing body 13 and tightening it.

Second stand off plate 9b is then placed onto the completely mounted and closed housing 6a and bolted down.

Since hereby the rotation position of blind holes 22 in head covers 8a, b for bolting on the standoff plates 9a,b depends on the final position of head covers 8a,b when screwing them into housing body 13, on the one hand, and, on the other hand, the rotation positions of standoff plates 9a,b have to be flush with each other to be able to bolt housing section 6a onto base plate 21, in one standoff plate 9b, facing housing section 6b normal pass-through holes are provided for bolting onto the head cover, on the other hand standoff plate 9a opposed from here has slotted holes 23 arched around the center, as can be seen best in FIG. 2c.

Through placing and fixating cable drum 2 and inserting measuring cable 3 through cable outlet turret 27 from the outside to the inside and through mounting to cable drum 2, the functional elements are complete and housing section 6b can be closed through inserting its head cover 8' and bolting it through tubular housing body 13' onto standoff plate 9b.

This can already be performed immediately after passing shaft 7 through and bolting standoff plate 9b on.

Figure 4:
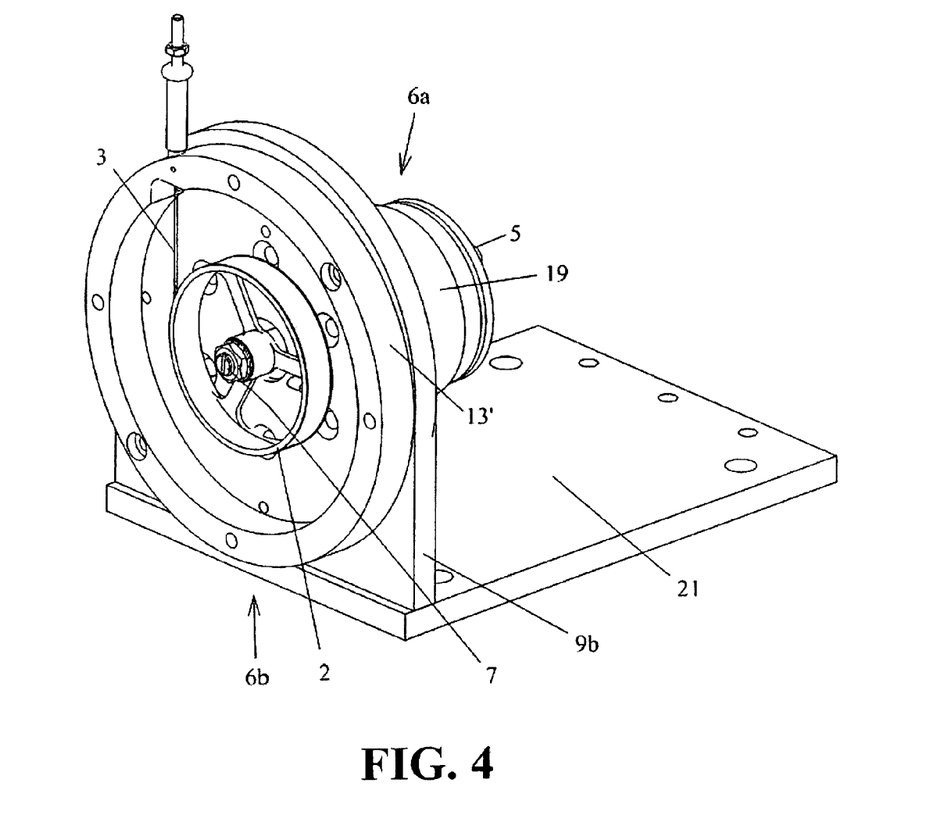
FIG. 4 is a partially assembled position sensor.

FIG. 4 furthermore shows a partially assembled position sensor, which results from choosing the described, particularly advantageous assembly process:

Thereby, initially, standoff plate 9b, located between the two housing parts 6a and 6b and carrying them, is mounted onto base plate 21.

Subsequently, the components contained in the two housing parts 6a and 6b are mounted one after the other, whereby one has to begin with bolting the abutting head cover 8b to standoff plate 9b, whereby respective seals, like lip seals 28, have to be inserted into these two parts previously.

Thereafter, shaft 7 can be pushed through the pass-through holes of these two plates.

Thereafter, the parts connected with shaft 7 in a rotation proof manner can be inserted and installed from both sides, this means cable drum 2 in the later housing section 6b and on the other side the flat spiral spring and spring housing 19 receiving it, on which further components are located later on, like e.g. angle sensor 5, which can only be partially seen in FIG. 4.

On the side of housing part 6b, the ring forming housing body 13' is put onto standoff plate 9b and bolted to it. Thereafter, measuring cable 3 is inserted through the outlet opening and through the cable inlet turret, which is typically attached on the outside of housing body 13' and mounted to cable drum 2 with its free end. Thereafter, cable 3 is wound onto cable drum 2 through rotating spring housing 19 relative to standoff plate 9b, and the flat spiral spring contained in the spring housing can be wound up, this means pre-loaded, and then spring housing 19 can be mounted in a rotation proof manner relative to the head cover, which carries it in this pre-loaded position.

This provides the state of assembly shown in FIG. 4, which further required assembly steps have already been explained.

REFERENCE NUMERALS

| | |
|---|---|
| 1 | Positions sensor |
| 2 | Cable drum |
| 3 | Measuring cable |
| 4 | Flat spiral spring |
| 5 | Angle sensor |
| 6 | Housing |
| 6a, b | Housing section |
| 7 | Shaft |
| 7a | Shoulder |
| 8a, b, 8' | Head cover |
| 9a, b | Standoff plate |
| 10 | Axial direction |
| 11 | Cable |
| 12 | Processing electronics |
| 13, 13' | Housing body |
| 14 | Annular gap |
| 15 | Threaded connection |
| 16 | O-ring |
| 17 | Cable grommet |
| 18, 18' | Pass through opening |
| 19 | Spring housing |
| 20 | Spacer |
| 21 | Base plate |
| 22 | Threaded blind hole |
| 23 | Slotted hole |
| 24 | Roller bearing |
| 25 | Torque link |
| 26 | Mounting Adapter |
| 27 | Turret |
| 28 | Lip seal |
| 29 | Clamping nut |
| 30 | Brush |
| 31 | Connector |

The invention claimed is:

1. A distance-measuring cable position sensor, pressure tight up to a certain external pressure, said position sensor comprising:
    a cable drum for winding up a measuring cable;
    a flat spiral spring for pre-loading a cable drum connected rotation proof with each other;
    an angle sensor rotation-coupled with the cable drum;
    first and second housing bodies;
    a first pressure-tight housing section having the flat spiral spring and the angle sensor located therein tight against external pressure;
    a second non-pressure tight housing section wherein the cable drum is located; and
    a shaft, connecting the cable drum with the flat spiral spring or the angle sensor, leads through the first pressure-tight housing section.

2. A distance-measuring cable position sensor according to claim 1 wherein said first pressure-tight housing is made from a sufficiently stable but easily workable salt water proof material.

3. A distance-measuring cable position sensor according to claim 1 further including first and second head covers.

4. A distance-measuring cable position sensor according to claim 1 wherein said first pressure tight housing section is formed by said first housing body being tubular or pot-shaped and having a rotationally symmetrical interior cross section in an end area and a radially overlapping said first head cover so that an axial length of an annular gap in between is large enough relative to its radial width that it is proof against ignition passage.

5. A distance-measuring cable position sensor according to claim 1 wherein said first housing body is tubular and made from one piece and closed by said first and second head covers on both sides.

6. A distance-measuring cable position sensor according to claim 1 wherein said first pressure-tight housing section includes said position sensor having processing electronics.

7. A distance-measuring cable position sensor according to claim 6 wherein said position sensor includes a cable for conducting electrical signals from said processing electronics through said first pressure-tight housing section to the outside of the housing.

8. A distance-measuring cable position sensor according to claim 1 wherein said position sensor includes a device for non-contact transfer of signals from the sensor and/or electrical energy into the sensor through a closed housing wall.

9. A distance-measuring cable position sensor according to claim 4 wherein said annular gap is a threaded connection between said first head cover and said first housing body, and on one end of the axial extension of the threaded connection is located at least one sealing element.

10. A distance-measuring cable position sensor according to claim 3 wherein said first head cover has a central pass-though hole wherein a cable grommet, or a connector, having a seal for running the cable out is inserted in a pressure tight or pressure proof manner that is safe against ignition passage.

11. A distance-measuring cable position sensor according to claim 3 wherein said first head cover has an axial thickness in excess of a necessary axial length of annular gaps which is safe against ignition passage in case of a cable grommet and also in case of an annular gap relative to said first and second housing bodies and also in case of the length of threaded blind holes therein.

12. A distance-measuring cable position sensor according to claim 3 wherein said second head cover or the bottom of a pot-shaped housing body is axially thicker than a necessary axial length of a threaded connection with the tubular housing body plus the axial extension of an O-ring and also longer than a depth of blind holes therein and also longer than the length of an annular gap safe against ignition passage, relative to said shaft plus the length of its roller bearings.

13. A distance-measuring cable position sensor according to claim 3 wherein said second head cover has a central pass-through opening located therein or in the bottom of a pot-shaped housing body wherein said shaft is held in a bearing immediately after an annular gap safe against ignition passage.

14. A distance-measuring cable position sensor according to claim 1 further including first and second standoff plates for bolting onto the front outer surface of first housing body which radially protrudes beyond first housing for mounting the first housing in parallel to a base plate, second standoff plate has circular pass-through holes for bolting into threaded blind holes in first housing and wherein first standoff plate has slotted holes arched around a center for bolting into the blind holes of a first head cover.

15. A distance-measuring cable position sensor according to claim 3 wherein said on second head cover or standoff plate a pot-shaped spring housing is placed with its open side, wherein said flat spring is supported on one end and which is also penetrated by said shaft wherein it is held in a bearing.

16. A distance-measuring cable position sensor according to claim 1 wherein said measuring cable is made from high strength material and has a plastic cover.

17. A distance-measuring cable position sensor according to claim 1 wherein said second housing body is pot-shaped and made from one piece.

18. A distance-measuring cable position sensor according to claim 17 wherein said second non-pressure tight housing includes a cable inlet turret located on the outer surface of the housing whose length in direction of the cable is large enough to keep a necessary lateral deflection for winding on the whole width of said cable drum small enough to reliably assure a single layer wind-up and having at least one brush located in the turret for cleaning said measuring cable.

19. A distance-measuring cable position sensor according to claim 17 wherein said second non-pressure tight housing body includes a cable inlet turret located on the outer surface of the housing whose length is long enough so that the length, in comparison to a radial width of an annular gap between said measuring cable and a pass-through opening in the turret, is large enough so that the gap is prof against ignition passage so that the housing body is also encapsulated tight against interior pressure and explosion proof.

20. A distance-measuring cable position sensor according to claim 6 wherein said processing electronics includes at least one printed circuit board is located axially between said angle sensor and a first head cover perpendicular to a longitudinal axis and is mounted to a spring housing through at least one spacer.

21. A distance-measuring cable position sensor, encapsulated against internal pressure, explosion proof, said sensor comprising:
    a cable drum for winding up a measuring cable;
    a flat spiral spring for pre-loading the cable drum connected with each in a rotation proof manner;
    an angle sensor coupled with the cable drum in a rotation proof manner;
    a housing;
    a first housing section, tight against internal pressure, having the flat spiral spring and angle sensor located therein;
    a non-pressure tight, non-explosion proof second housing section having the cable drum located therein; and
    a shaft, connecting the cable drum with the flat spiral spring or the angle sensor in a rotation proof manner, leads through the pressure tight housing section.

22. A distance-measuring cable sensor according to claim 21 wherein the pressure tight housing is made from stainless steel.

23. A distance-measuring cable position sensor according to claim 21 wherein the pressure tight housing is sized strong enough to it stands an internal explosion pressure without gaps existing in the housing becoming unsafe against ignition passage.

24. A process for mounting a pressure tight, explosion proof position sensor, said process comprising the following steps:
    pushing a shaft from the inside out first through a roller bearing and thereafter through a second head cover or a bottom of a pot-shaded second housing body until a shoulder of the shaft contacts;
    pushing a spring housing with an inserted flat spiral spring therein onto the shaft from its rear free end and connecting the flat spiral spring with the shaft in a rotation proof manner;
    connecting rotation proof the spring housing with the second head cover or a bottom of a first pressure-tight housing section;

placing rotation proof an angle sensor onto the rear end of the shaft and supporting it with a torque link relative to the spring housing; and electrically connecting the angle sensor.

25. A process for mounting a pressure tight, explosion proof position sensor, according to claim 24 further including the step of mounting processing electronics of the angle sensor through at least one spacer at the spring housing.

26. A process for mounting a pressure tight, explosion proof position sensor, according to claim 25 further including the steps of pulling a cable connected to the processing electronic through a first head cover and a cable grommet and screwing in and tightening a second head cover in a frontal opening of first and second housing bodies and thereafter inserting the cable gromment into the first head cover.

27. A process for mounting a pressure tight, explosion proof position sensor, according to claim 24 including providing a connector in the first head cover and electrically connecting the processing electronics with the angle sensor.

28. A process for mounting a pressure tight, explosion proof position sensor according to claim 24 wherein signals derived by the sensor are transferred through closed housing walls to the outside in a non-contact manner through electromagnetic waves.

29. A process for mounting a pressure tight, explosion proof position sensor according to claim 24 wherein energy required for the operation of the sensor is provided without contact through electromagnet waves from the outside through the closed housing wall.

* * * * *